United States Patent
Chiu et al.

(10) Patent No.: US 10,148,459 B2
(45) Date of Patent: Dec. 4, 2018

(54) NETWORK SERVICE INSERTION

(71) Applicant: HEWLETT-PACKARD DEVELOPMENT COMPANY, L.P., Houston, TX (US)

(72) Inventors: Jechun Chiu, Austin, TX (US); Venkatavaradhan Devarajan, Bangalore (IN); Duane Edward Mentze, Roseville, CA (US); Craig Joseph Mills, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/117,265

(22) PCT Filed: Apr. 29, 2014

(86) PCT No.: PCT/IN2014/000287
§ 371 (c)(1),
(2) Date: Aug. 8, 2016

(87) PCT Pub. No.: WO2015/166506
PCT Pub. Date: Nov. 5, 2015

(65) Prior Publication Data
US 2016/0352538 A1 Dec. 1, 2016

(51) Int. Cl.
*H04L 12/64* (2006.01)
*H04L 12/46* (2006.01)
(Continued)

(52) U.S. Cl.
CPC ...... *H04L 12/6418* (2013.01); *H04L 12/4633* (2013.01); *H04L 12/4641* (2013.01);
(Continued)

(58) Field of Classification Search
CPC ............... H04L 12/66; H04L 12/4641; H04L 12/4633; H04L 12/6418; H04L 49/70;
(Continued)

(56) References Cited

U.S. PATENT DOCUMENTS

| | | | |
|---|---|---|---|
| 2003/0110081 A1 | 6/2003 | Tosaki et al. | |
| 2004/0223465 A1* | 11/2004 | Lee | H04L 12/189 370/313 |

(Continued)

FOREIGN PATENT DOCUMENTS

| | | |
|---|---|---|
| CN | 101299717 A | 11/2008 |
| CN | 101437037 A | 5/2009 |

(Continued)

OTHER PUBLICATIONS

"Wedge Networks: Transparent Service Insertion in SDNs Using Openflow," Wedge Networks Whitepaper, Sep. 19, 2012, pp. 1-5, Wedge Networks.

(Continued)

*Primary Examiner* — Peter Chen
(74) *Attorney, Agent, or Firm* — Trop, Pruner & Hu, P.C.

(57) ABSTRACT

Network service insertion includes determining a tunnel interface corresponding to a service entity to which an incoming packet is to be directed, the tunnel interface being determined based on software defined network (SDN) flow rules. Further, the incoming packet can be encapsulated based on a tunnel configuration corresponding to the tunnel interface to generate an encapsulated packet such that the encapsulated packet includes media access control (MAC) address headers and a virtual local area network (VLAN) tag associated with the incoming packet. The encapsulated packet can be sent to the service entity through the tunnel interface for network service insertion.

18 Claims, 8 Drawing Sheets

(51) Int. Cl.
*H04L 12/741* (2013.01)
*H04L 29/12* (2006.01)
*H04L 29/06* (2006.01)
*H04L 29/08* (2006.01)

(52) U.S. Cl.
CPC ........ *H04L 45/745* (2013.01); *H04L 61/2592* (2013.01); *H04L 61/6022* (2013.01); *H04L 69/22* (2013.01); *H04L 69/324* (2013.01); *H04L 69/325* (2013.01)

(58) Field of Classification Search
CPC ..... H04L 45/586; H04L 45/745; H04L 45/64; H04L 45/66; H04L 45/72; H04L 45/74; H04L 69/22; H04L 47/825; H04L 61/2592; H04L 61/6022; H04L 61/2007; H04L 49/354; H04L 69/324; H04L 69/325
See application file for complete search history.

(56) References Cited

U.S. PATENT DOCUMENTS

| | | | |
|---|---|---|---|
| 2007/0140250 A1* | 6/2007 | McAllister | H04L 12/4645 370/392 |
| 2009/0141729 A1 | 6/2009 | Fan | |
| 2012/0099602 A1* | 4/2012 | Nagapudi | H04L 12/4633 370/401 |
| 2013/0121321 A1 | 5/2013 | Backes | |
| 2013/0272305 A1 | 10/2013 | Lefebvre et al. | |
| 2013/0329734 A1 | 12/2013 | Chesla et al. | |
| 2014/0050223 A1 | 2/2014 | Foo | |
| 2014/0092907 A1* | 4/2014 | Sridhar | H04L 12/4633 370/392 |
| 2015/0281099 A1* | 10/2015 | Banavalikar | H04L 12/4633 370/230 |
| 2016/0330045 A1* | 11/2016 | Tang | H04L 12/462 |

FOREIGN PATENT DOCUMENTS

| | | | | |
|---|---|---|---|---|
| JP | WO 2008047930 A1 * | 4/2008 | ........ | H04L 12/4633 |
| WO | WO-2011/026402 A1 | 3/2011 | | |

OTHER PUBLICATIONS

Dr. Jim Metzler et al., "The 2013 Guide to Network Virtualization and SDN," Dec. 15, 2013, pp. 1-70, Webtorials.

International Search Report and Written Opinion, International Application No. PCT/IN2014/000287, dated Jan. 28, 2015, pp. 1-9, SIPO.

* cited by examiner

NETWORK SERVICE INSERTION

BACKGROUND

Network service insertion, also referred to as service insertion, generally refers to insertion of a network service provided by a service entity into a flow of traffic in a network. A flow of traffic may refer to data packets that traverse a particular route in the network and match particular flow rules. Service entity can refer to any computing system that can execute applications to provide network services. Various applications, such as load balancers, firewalls, intrusion prevention systems (IPS), intrusion detection systems (IDS), web filtering, domain name system (DNS) filtering, and the like, may be inserted as a network service by the service entity.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components.

DETAILED DESCRIPTION

Figure 1A:
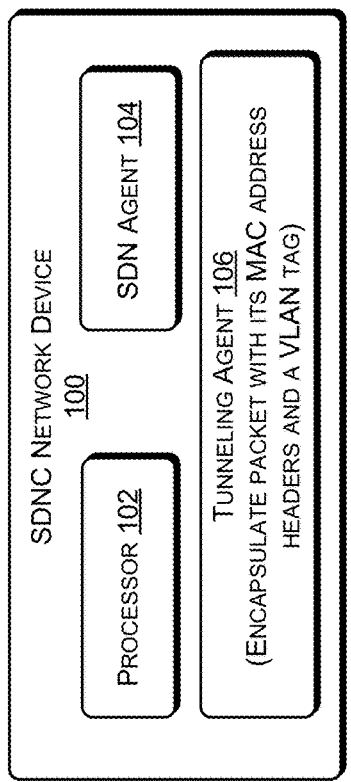
FIG. 1a illustrates an example network device for network service insertion, according to an example of the present subject matter.

Aspects of the present subject matter relate to devices and methods for network service insertion. As mentioned above, network service insertion generally refers to insertion of a service provided by a service entity into a flow of traffic in a network for provision of various services, such as intrusion detection, intrusion prevention, firewall, web filtering, and the like. The service entity to be inserted in the network is generally deployed based on the type of network, the network control configuration, and the configuration of network devices in the network. As discussed herein, the term network device can refer to a switch, a router, a bridge, or any other computing device used for directing packets in a network.

For example, in case of a software defined network (SDN), such as an OpenFlow network, the network control logic lies in a flow controller of the SDN. The flow controller communicates directly with the network devices within an Internet Protocol (IP) subnet to steer the flow of traffic through the network devices based on flow rules. Hence, in an SDN, the service entity is generally deployed in the IP subnet of the SDN so that a network device can transparently steer packets, which match a particular flow rule, through the service entity before forwarding the packets to their destination. This results in reduced flexibility in the deployment of the service entity.

On the other hand, in a non-SDN, also referred to as a legacy network, the network control logic is configured in the settings of the network devices in the network. Hence, the network topology and the settings of the network devices generally have to be reconfigured to deploy the service entity. This can involve network downtime while the reconfiguration is performed and can also affect network security in case there are any errors in the reconfiguration.

Aspects of the present subject matter relate to devices and methods for network service insertion in SDNs and in hybrid networks that include both SDNs and non-SDNs or legacy networks. The devices and the methods of the present subject matter allow the service to be inserted in a flow of traffic irrespective of an IP subnet in which the service entity is deployed. Further, aspects of the present subject matter can be used for insertion of various types of services, such as traffic inspection and re-injection services, traffic monitoring services, or traffic re-routing services with possible content modification, in a dynamic, transparent, secure, and efficient manner.

In one implementation, an SDN compatible network device can be used for steering network traffic to a service entity for service insertion. In one example, the SDN compatible network device, also referred to as SDNC network device hereinafter, can use flow rules for directing packets. In another example, the SDNC network device can be a hybrid network device that can use flow rules and non-SDN device settings, such as Layer-2 (L2)/Layer-3 (L3) lookup settings, for directing data packets. As will be understood, L2/L3 lookup settings refer to the device settings used by legacy or non-SDN network devices for directing packets. The term packets as used herein can refer to L2 packets (frames) or L3 packets.

In operation, the SDNC network device can steer packets to the service entity based on the flow rules provided by an SDN controller to the SDNC network device. Since the SDN controller can dynamically configure the flow rules in the SDNC network device, the selection of traffic flows for steering to the service entity can be done dynamically. For example, the SDN controller can actively configure flow rules in the SDNC network device with little or no network downtime. In one example, the SDN controller can specify in the flow rules that the traffic flow is to be steered to the service entity through a tunnel.

As a result, for sending packets to and receiving packets from the service entity, the SDNC network device can use a tunnel interface. For this, the SDNC network device can encapsulate the incoming packets that match a particular flow rule and can send the encapsulated packets to the service entity through the tunnel interface. Each encapsulated packet can include the media access control (MAC) address headers and a virtual local area network (VLAN) tag associated with the incoming packet, also referred to as original MAC address headers and original VLAN tag. In one example, the original VLAN tag may be a VLAN tag that was present in the incoming packet. In another example, the original VLAN tag may be a VLAN tag inserted by the SDNC network device when the incoming packet did not have a VLAN tag.

In one example, the tunnel interfaces and the corresponding tunnel configurations to be used for insertion of different service entities can be specified by the SDN controller. Thus, the SDN controller can also dynamically provide the tunnel configurations to the SDNC network device for inserting the service entity in the network. Moreover, depending on where the service entity is deployed, different tunnel configurations may be used. In one example, in case the service entity is deployed in the same IP subnet as the SDNC network device, an L2-in-L2 tunnel may be used. In another example, in case the service entity is deployed in a different IP subnet from the SDNC network device, an L2-in-L3 tunnel may be used to send the packets to the service entity. Also, the tunnel used may be a multicast tunnel for forwarding the encapsulated packet to multiple instances of the service entity or may be a unicast tunnel.

Further, it will be understood that encapsulation, as used herein, refers to addition of encapsulation headers to a packet to facilitate transfer of the packet from one network entity to another. During encapsulation, the original header of the packet may also be modified, as discussed herein. Decapsulation refers to the removal of the encapsulation headers to retrieve the packet for further processing. The packet retrieved after decapsulation thus has the original header and the modifications that may have been made during encapsulation.

On receiving the encapsulated packets, the service entity can decapsulate the packets and perform various services including intrusion detection, intrusion prevention, web filtering, etc. Based on the type of service performed, the service entity can take a post-service action including, for example, sending the packets back to the SDNC network device over the tunnel through which the packets were received, forwarding the packets over a second tunnel to a destination device, forwarding the packets over a second tunnel to a second network device that can direct the packets to the destination device, or discarding the packets.

In case the packets are to be sent back to the SDNC network device, the service entity can re-encapsulate the packets, along with the original MAC address headers and the original VLAN tag, and send the re-encapsulated packets to the SDNC network device over the tunnel through which the packets were received. The SDNC network device can then decapsulate the received packets and take a next set of actions on the received packets. For example, based on the flow rules, the SDNC network device can again encapsulate the received packets and send the encapsulated packets to a second service entity for insertion of a second network service. Thus, a chain of network services can be inserted in the traffic flow with the packets still retaining the original MAC address headers and the original VLAN tag at the end of the service chain.

Further, the SDNC network device can forward the packets, upon service insertion, to a destination device. In one example, the packets can be forwarded from the SDNC network device to the destination device based on the legacy or non-SDN L2/L3 lookup settings in the SDNC network device. In another example, the packets can be forwarded from the SDNC network device to the destination device based on the flow rules provided by the SDN controller.

As used herein, references to packets being sent to a destination device include packets being sent through various intermediate network devices and are not limited to packets being sent to a destination device directly. Similarly, references to packets being received from a source device include packets being received through various intermediate network devices and are not limited to packets being received from a source device directly. The destination device and the source device can be any computing system, such as a server, a workstation, a mobile device, and the like. As mentioned above, since the packets retain the original MAC address headers and the original VLAN tag when forwarded from the SDNC network device 100, the network service insertion is transparent to the destination device.

In one example, to ensure that the packets are not sent back over the inbound port of the SDNC network device at which they were originally received from the source device, the SDNC network device can perform a reverse look-up of the L2/L3 lookup settings. Based on the original MAC address headers and the original VLAN tag, the SDNC network device can determine an original inbound port at which the packets were originally received. Thus, determination of the original inbound port can be done without additional metadata being inserted into packet headers. Based on the original inbound port, port level policies can also be applied on the packets after the service insertion. The port level policies can include traffic sampling for network visibility, Quality of Service (QoS), Access Control List (ACL), etc.

Thus, the devices and methods can facilitate insertion of various types of network services in SDNs and in hybrid networks deploying both SDN compatible network devices and non-SDN network devices. Further, the devices and methods can provide flexibility in deployment of the service entity, in selecting traffic flows to be directed to the service entity, and in types of post-service action that can be taken. Moreover, the service insertion can be transparent to the source device and the destination device, and port level policies can be applied after the service insertion.

The above aspects of the present subject matter and other aspects are further described in conjunction with the following figures. It should be noted that the description and figures merely illustrate the principles of the present subject matter. Further, various arrangements may be devised that, although not explicitly described or shown herein, embody the principles of the present subject matter and are included within its scope.

Examples of how devices and methods for network service insertion may be implemented are explained in detail with respect to the figures. While aspects of described devices and methods for network service insertion can be implemented in any number of different devices, environments, and/or implementations, the examples and implementations are described in the context of the following figure(s).

FIG. 1a illustrates an example SDN compatible (SDNC) network device 100 for network service insertion, according to an example of the present subject matter.

The SDNC network device 100 can be an SDN compatible network device that can receive flow rules from a SDN controller for forwarding incoming packets. For example, the SDN controller can be an OpenFlow controller and the SDNC network device 100 can be an OpenFlow switch that communicates with the OpenFlow Controller using the OpenFlow protocol. In this example, the SDNC network device 100 may be an OpenFlow version 1.3 compliant switch. In other examples, the SDNC network device 100 and the SDN controller can implement other SDN technologies and protocols.

In one implementation, the SDNC network device 100 can include a processor 102, an SDN agent 104 coupled to the processor 102, and a tunneling agent 106 coupled to the processor 102.

In one implementation, the SDN agent 104 can determine, based on flow rules, a tunnel interface corresponding to a service entity to which an incoming packet is to be directed. Further, the tunneling agent 106 can encapsulate the incoming packet based on a tunnel configuration corresponding to the tunnel interface to generate an encapsulated packet. The tunneling agent 106 can encapsulate the incoming packet such that the encapsulated packet includes media access control (MAC) address headers and a virtual local area network (VLAN) tag associated with the incoming packet.

In one example, the VLAN tag associated with the incoming packet may be a VLAN tag present in the incoming packet. In another example, the VLAN tag associated with the incoming packet may be a VLAN tag inserted by the tunneling agent 106 when the incoming packet does not include a VLAN tag. In one example, the inserted VLAN tag may include a VLAN id assigned based on one of a PVID of an inbound port, a protocol of the incoming packet, the MAC address of the incoming packet and an IP address of the incoming packet. The tunneling agent 106 can then provide the encapsulated packet for forwarding to the service entity through the tunnel interface, as will be discussed in detail later with reference to FIGS. 1c and 1d.

Figure 1B:
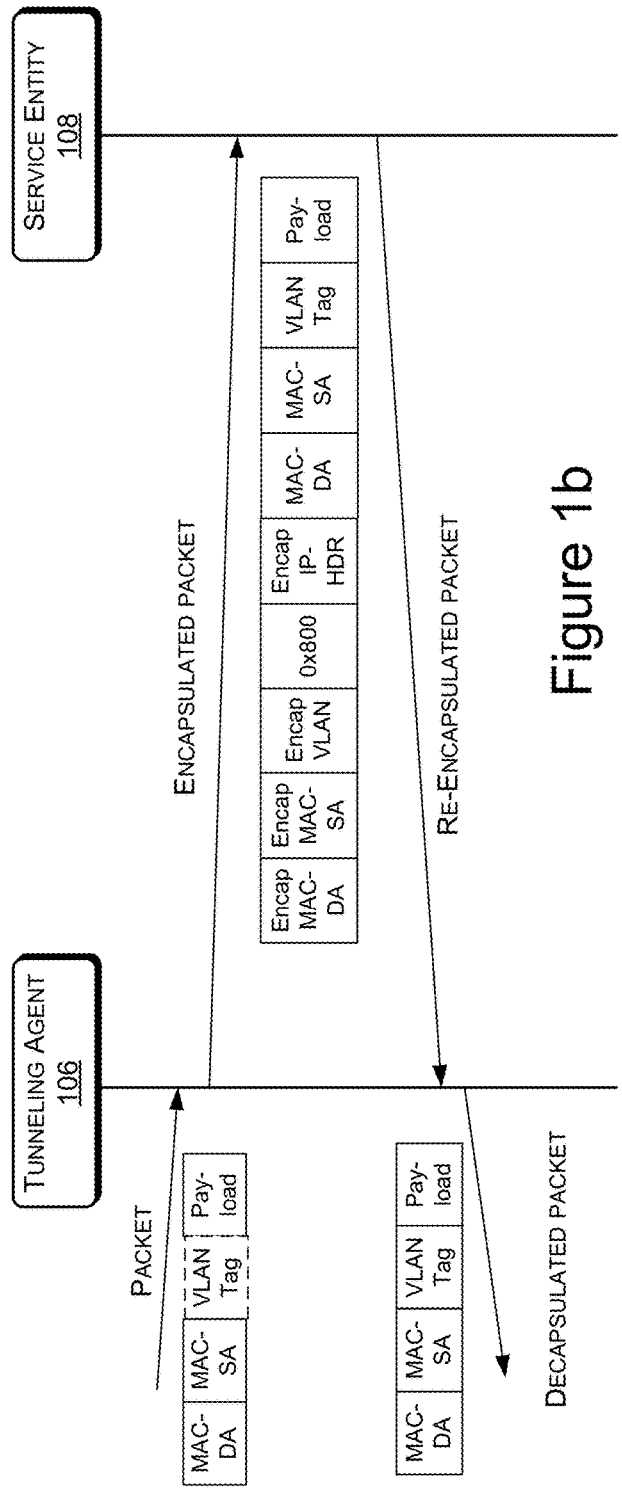
FIG. 1b illustrates an example scenario for packet encapsulation, according to an example of the present subject matter.

FIG. 1b illustrates an example scenario for packet encapsulation, according to an example of the present subject matter.

As shown in FIG. 1b, the tunneling agent 106 can receive an incoming packet for encapsulation and forwarding to a service entity 108 over a tunnel interface as determined by the SDN agent 104. The incoming packet can be a L2 packet and can include MAC address headers including destination address (DA) and source address (SA). The incoming packet can further include payload corresponding to data of higher level layers, such as layer 3 to layer 7, of the Open System Interconnection (OSI) model or corresponding layers of the Internet Protocol (IP) suite. In one example, the incoming packet can include a VLAN tag, whereas, in another example, the incoming packet may not include a VLAN tag.

The tunneling agent 106 can encapsulate the incoming packet based on a tunnel configuration corresponding to the tunnel interface determined by the SDN agent 104 and can provide an encapsulated packet for sending to the service entity 108. It will be appreciated that the SDNC network device 100 includes additional components for communicating with the service entity 108 and that the transfer of the encapsulated packet from the tunneling agent 106 to the service entity 108 and receipt of a re-encapsulated packet by the tunneling agent 106 is shown for illustration purposes.

As shown in the FIG. 1b, the encapsulated packet has encapsulation headers, such as encapsulation MAC address headers, encapsulation VLAN tag, and a header field for indicating a type of encapsulation. For example, the header field 0x800 can indicate an IP encapsulation. It will be appreciated that, in other examples, there may be additional header fields depending on the type of encapsulation.

In addition to the encapsulation headers, the encapsulated packet includes the original MAC address headers of the incoming packet, an original VLAN tag associated with the incoming packet, and the payload of the incoming packet. In one implementation, the original VLAN tag corresponds to the VLAN tag present in the incoming packet. In another implementation, when the incoming packet did not include a VLAN tag, the tunneling agent 106 inserts a VLAN tag as the original VLAN tag.

For example, the tunneling agent 106 may insert a PVID of an inbound port, at which the SDNC network device 100 received the incoming packet, as the VLAN tag. In another example, the tunneling agent 106 may determine a VLAN id from a VLAN assignment configuration based on inbound packet's protocol or MAC or IP address, and may insert the determined VLAN id as the VLAN tag. Thus, the encapsulated packet includes an original VLAN tag irrespective of whether the incoming packet included a VLAN tag. The original VLAN tag and the original MAC address headers help in determining the inbound port at which the incoming packet was first received at the SDNC network device 100, as will be discussed in detail later.

On receiving the encapsulated packet, the service entity 108 can decapsulate the encapsulated packet, perform one or more services, and depending on the service(s) performed, can take a post-service action. In one implementation, the post-service action can include re-encapsulating the packet and sending the re-encapsulated packet back to the SDNC network device 100, where it may be decapsulated by the tunneling agent 106 to obtain a decapsulated packet. The re-encapsulated packet, like the encapsulated packet, includes encapsulation headers to encapsulate the original MAC address headers, the original VLAN tag, and the payload. As shown, the decapsulated packet includes the original MAC address headers, the original VLAN tag, and the payload. Thus, the decapsulated packet includes the original VLAN tag irrespective of whether the incoming packet included a VLAN tag.

Various implementations for network service insertion are further described in detail below with reference to FIGS. 1c and 1d.

Figure 1C:
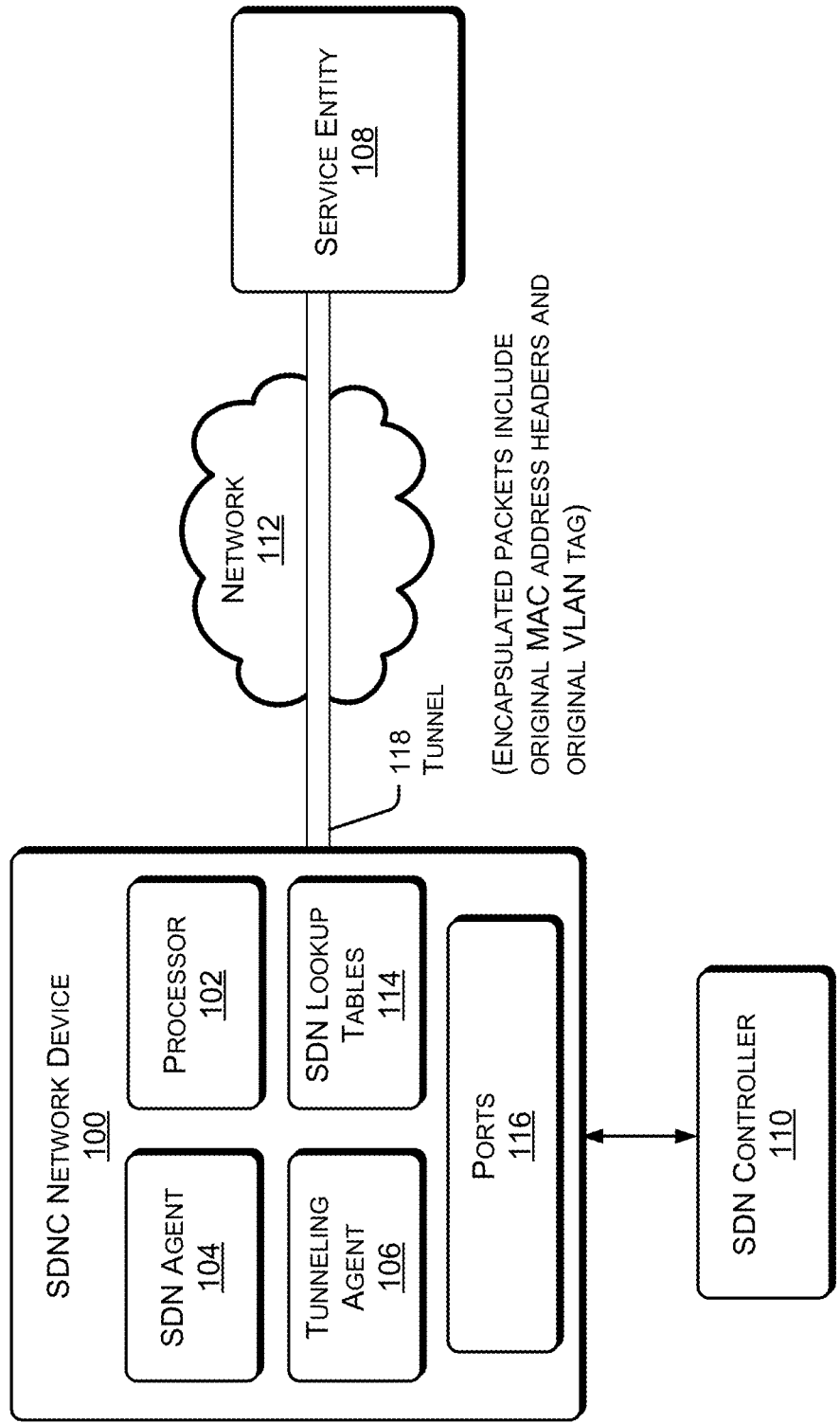
FIG. 1c illustrates an example network environment implementing network service insertion, according to an example of the present subject matter.
Figure 1D:
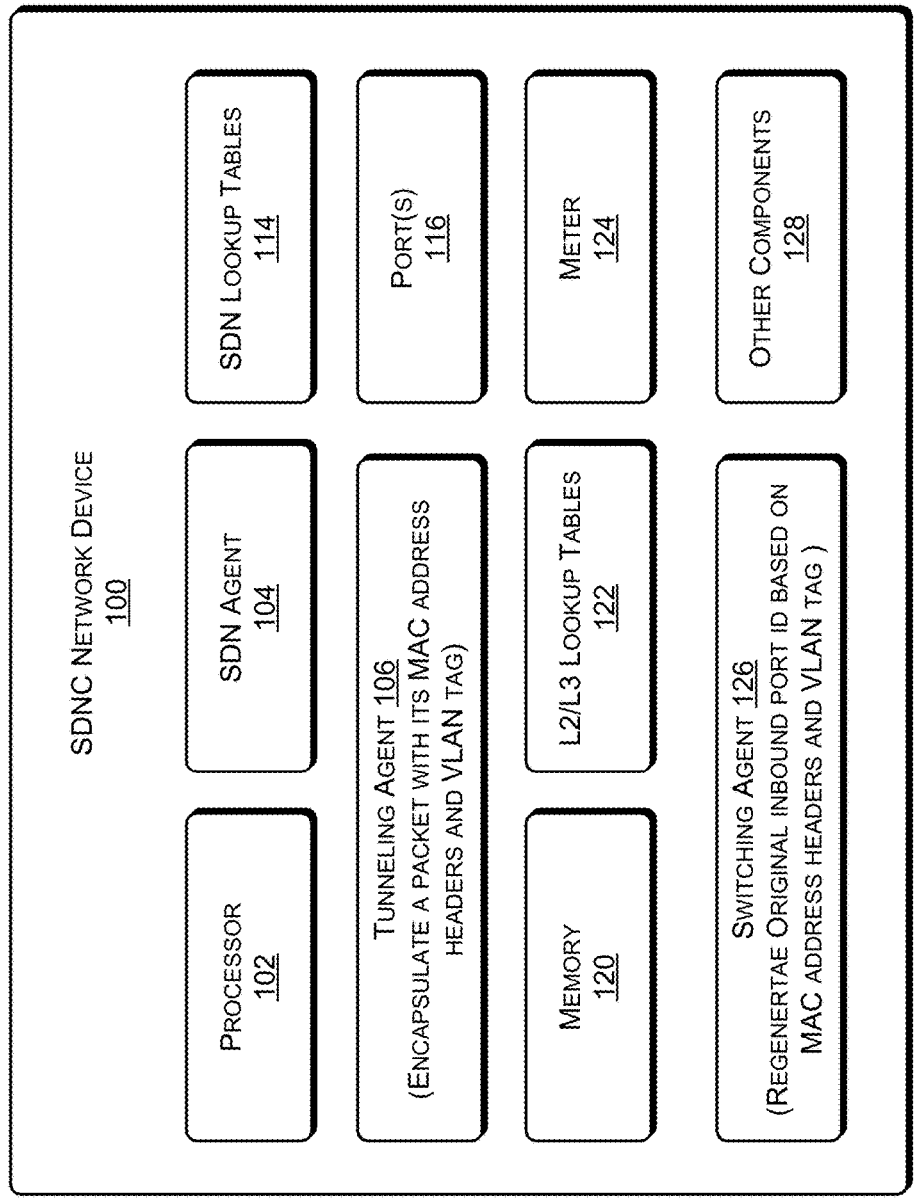
FIG. 1d illustrates an example network device for implementing network service insertion, according to an example of the present subject matter.

FIG. 1c illustrates a network environment for implementing network service insertion, according to an example of the present subject matter. The network environment includes the SDNC network device 100, an SDN controller 110, and the service entity 108 that can communicate with the SDNC network device 100 over a network 112. As will be appreciated, the network 112 can include multiple other network devices and network elements, which are not illustrated for ease of understanding. Further, while the SDN controller 110 and the SDNC network device 100 have been shown as communicating with each other over a communication link, it will be understood that they may communicate with each other either directly or through other network devices not shown in the figure.

The service entity 108 can be, for example, a server, a workstation, a network device, or any computing device that can examine contents or payload of packets and can run various applications to provide a service, such as a traffic monitoring service, a traffic inspection and re-injection service, or a traffic re-routing service based on the contents or payload. Accordingly, the service entity 108 can include processors, memory, and various hardware and software components and modules for its functioning, which are not illustrated or described herein, but will be understood.

In one example, the SDNC network device 100 can include the processor 102, the SDN agent 104, the tunneling agent 106, SDN lookup tables 114, and ports 116. The ports 116 can include physical ports that correspond to physical interfaces of the SDNC network device 100 and logical ports that may be configured over the physical ports. Further, some of the ports 116 may be reserved, such as for communicating with the SDN controller 110.

It will be understood that the functions of various components, such as the processor 102, the SDN agent 104, the tunneling agent 106, the SDN lookup tables 114, and the ports 116, may be provided through the use of dedicated hardware, firmware, or through hardware capable of executing software in association with appropriate software. The processor 102 may be a dedicated processor, a shared processor, or a plurality of individual processors, some of which may be shared. It will also be understood that, for its functioning, the SDNC network device 100 may include other hardware, firmware, or software components, which may not be explicitly mentioned herein.

In operation, the SDN controller 110 can provide flow rules to the SDNC network device 100 for forwarding incoming packets through the ports 116. The flow rules can be stored in the SDN lookup tables 114 in the form of flow entries. For this, the SDN controller 110 can communicate with the SDN agent 104. The SDN agent 104 can provide a flow configuration interface to the SDN controller 110 to add, update, and delete flow entries in the SDN lookup tables 114.

The flow entries can include various fields, including but not limited to, match fields based on which an incoming packet can be matched to determine whether a flow entry is applicable to the incoming packet, and instruction fields corresponding to a set of instructions to be applied to matching packets. Further, there can be multiple lookup tables stored in a particular sequence in the SDN lookup tables 114 for pipeline processing. For example, matching can start at the first table in the sequence, with the first matching entry in a table being used for executing the instructions associated with the corresponding flow entry. The instructions can correspond to various actions, such as packet forwarding, packet modification, or sending to a subsequent table for further processing. Each lookup table can also include a table-miss flow entry that specifies instructions for the case when there is no match found in that lookup table. For example, based on the table-miss flow entry, the packet may be forwarded to the SDN controller 110, may be dropped, or matching may continue with the next flow table in the sequence.

In one implementation, for service insertion, the flow entries in the SDNC network device 100 can include instructions to forward incoming packets, which match a particular flow rule, to the service entity 108 and instructions to process packets received from the service entity 108. The flow rule may be matched based on, for example, fields related to a source device of the incoming packets, fields related to a destination device of the incoming packets, fields related to the type of data in the incoming packets, and the like. Further, the flow entries can specify a tunnel to be used for sending packets to and receiving packets from the service entity 108.

To facilitate the SDNC network device 100 to use tunnels to communicate with service entities, such as the service entity 108, the SDN agent 104 can present tunnel interfaces as logical ports in the ports 116 to the SDN controller 110. Further, the SDN agent 104 can support instructions for packets coming or going through tunnel interfaces, such as matching inbound port id, taking an outbound port action on a specified port, taking an outbound port action on a group port, reading port counters, and the like, in the same manner as supported for other physical or logical ports in the ports 116.

In one example, the SDN controller 110 can provide a tunnel configuration for each of the tunnel interfaces presented by the SDN agent 104. The SDN controller 110 can provide the tunnel configurations to the SDNC network device 100 through a tunnel configuration interface presented by the tunneling agent 106 and the tunnel configurations can be stored in the tunneling agent 106. The tunnel configuration interface can include, for example, a Simple Network Management Protocol (SNMP) interface support for creating or deleting tunnel interfaces, configuring tunnel interface attributes and encapsulation attributes, and reading tunnel interface status. The tunnel configuration interface can also include a command line interface support for displaying the tunnel attributes along with operational status and statistics information.

Further, the tunnel configuration can specify that the MAC address headers and VLAN tag of the incoming packet, also referred to as original MAC address headers and original VLAN tag, are to be included in the encapsulated packet. In case the incoming packet does not have a VLAN tag, the tunnel configuration can specify that, in one example, the VLAN tag is inserted with the Port Virtual ID (PVID) of the inbound port as the VLAN id in the VLAN tag. In another example, in case the inbound port has a VLAN assignment configuration, for example, based on MAC or IP address, which supersedes the PVID configuration, then the MAC or IP based VLAN id can be inserted in the VLAN tag. Thus, the encapsulated packet can include a VLAN tag associated with the incoming packet, which may be either a VLAN tag of the incoming packet or a VLAN tag inserted based on the tunnel configuration.

The tunnel configuration can also specify that a priority field of the encapsulated packet can reflect a priority of the incoming packet, for example, the priority corresponding to the Priority Code Point (PCP) field in the VLAN tag of the incoming packet or a Quality of Service (QoS) remark.

In one example, the tunnel interface attributes in the tunnel configuration can include configurable attributes, such as interface name, tunnel type, rate-limit, and storage type, and read only attributes, such as a unique interface index, an available bandwidth, a Maximum Transmission Unit (MTU), and the like. Further, the tunnel type in the tunnel interface attributes can indicate a purpose of the tunnel and whether the SDNC network device 100 may also receive packets from the service entity 108 over the tunnel used for sending the packets. For example, if the tunnel type is intercept, it can indicate that the packets from the tunnel can be intercepted by the service entity 108 and may be re-injected by the service entity 108 after processing. If the tunnel type is forward, it can indicate that the tunnel can be used for re-routing as a general purpose tunnel and may not receive packets from the service entity 108. Further, if the tunnel type is copy, it can indicate that the tunnel can be used for mirroring data, which is forwarded from the SDNC network device 100 to a destination device, to the service entity 108 and the SDNC network device 100 may not receive packets from the service entity 108 over this tunnel.

The encapsulation attributes in the tunnel configuration can include, for example, source endpoint IP address, destination endpoint IP address, encapsulation type, tunnel Identifier, Differentiated Services Code Point (DSCP), Time To Live (TTL), Virtual Network Interface (VNI), etc. The encapsulation type specified can be, for example, User Datagram Protocol (UDP), Generic Routing Encapsulation (GRE), Virtual eXtensible LAN (VxLAN), Network Virtualization using GRE (NVGRE), or a proprietary encapsulation type. Accordingly, the tunnel identifier can be, for example, UDP port (source/destination), GRE key, etc. The statistics information can include, for example, counters for packets received, packets transmitted, packets dropped, rate of transfer of packets, and the like.

In one example, the SDN controller 110 can also configure notifications or traps to be sent from the tunneling agent 106 for tracking status change of the tunnel interfaces in the SDNC network device 100. As is understood, traps refer to unsolicited messages related to an event and can be sent from an agent in a device to a controller monitoring the device. Thus, the tunneling agent 106 can notify the SDN controller 110 on any change in status of the tunnel interfaces, such as when a tunnel interface is down or up. Based on the trap notification, the SDN controller 110 can decide whether a remedial action is to be taken, for example, when a tunnel interface is down. The tunnel interface status change can also be logged to event logs in the SDN controller 110 for subsequent analysis.

Further, in case a tunnel interface is deleted and certain flow rules use the deleted tunnel interface as an outbound port, packets directed to that outbound port may be dropped. To allow the SDNC network device 100 to operate in a fail safe mode, in one example, the tunnel configuration can provide that in case connection to the SDN controller 110 is lost, traffic flows using tunnels as out ports may continue to forward traffic to the tunnels until the connection is restored and further instructions are received from the SDN controller 110. In another example, in case connection to the SDN controller 110 is lost, the SDNC network device 100 may ignore the flow rules and directly forward the incoming packets to the destination device until the connection is restored. In one example, to enhance data security, the SDN controller 110 can also specify encryption and decryption to be used at the tunnel interfaces when the SDNC network device 100 supports encryption and decryption.

In operation, on receiving an incoming packet from a source device, the SDN agent 104 can refer the SDN lookup tables 114 to identify, from a matching flow rule, instructions indicating a tunnel interface corresponding to the service entity 108 to which the incoming packet is to be directed. The SDN agent 104 can then provide the incoming packet and the instructions to the tunneling agent 106.

Further, the tunneling agent 106 can encapsulate the incoming packet based on a tunnel configuration corresponding to the tunnel interface to generate an encapsulated packet. The encapsulated packet can include the original MAC address headers and the original VLAN tag. In one example, in case the incoming packet does not include a VLAN tag, the tunneling agent 106 can insert a VLAN tag as the original VLAN tag. The inserted VLAN tag can include, as a VLAN id, a PVID of the inbound port or a MAC or IP or protocol based VLAN id configured for the inbound port. Based on the original MAC address headers and the original VLAN tag in the encapsulated packet, the source device and destination device of the encapsulated packet can be identified. Additionally, an original inbound port at which the incoming packet was originally received by the SDNC network device 100 can also be identified using the original MAC address headers and the original VLAN tag.

In one example, the priority field of the encapsulated packet can reflect the priority of the incoming packet, for example, the priority corresponding to the Priority Code Point (PCP) field in the incoming packet or a Quality of Service (QoS) remark of the incoming packet. Thus the encapsulated packet may be processed by the service entity 108 with the same priority as the incoming packet.

The tunneling agent 106 can provide the encapsulated packet for forwarding to the service entity 108 through the tunnel interface, for example, through the tunnel 118. In one example, the tunnel 118 may be used to send the encapsulated incoming packets to the service entity 108 over the network 112. The network 112 may be a part of the IP subnet of the SDN controller 110 or may be a combination of networks including networks outside the IP subnet of the SDN controller 110. Accordingly, the service entity 108 can be deployed within the IP subnet of the SDN controller 110 or in a different IP subnet and the tunnel 118 may be an L2-in-L2 tunnel or an L2-in-L3 tunnel. An L2-in-L2 tunnel can be, for example, a MAC-in-MAC tunnel or a VLAN-in-VLAN tunnel. An L2-in-L3 tunnel can be, for example, a MAC-in-IP tunnel.

The network 112 may be a wired network, a wireless network or a combination of a wired and wireless network. The network 112 can also be a collection of individual networks, which may use different protocols for communication, interconnected with each other. Further, the network 112 can include various network elements, such as gateways, modems, routers; however, such details have been omitted for ease of understanding. Thus, flexibility can achieve in deployment of the service entity 108.

Further, based on the type of service being inserted, the SDNC network device 100 may also receive packets over the tunnel 118 from the service entity 108. Upon receiving a packet from the service entity 108 through the tunnel 118, the SDNC network device 100 can determine a forwarding action for the received packet based on the SDN lookup tables 114. The forwarding action can be determined based on an id of the tunnel interface, and the original MAC address headers and the original VLAN tag encapsulated in the received packet. For example, the forwarding action can correspond to forwarding the received packet to a second service entity through a second tunnel interface, forwarding the received packet to a destination device, or forwarding the received packet based on the L2/L3 settings. As mentioned above the L2/L3 settings correspond to the non-SDN or legacy lookup settings.

Aspects of the SDNC network device 100 for network service insertion are further described in detail with reference to FIG. 1d. FIG. 1d illustrates an example SDNC network device 100 for implementing network service insertion, according to an example of the present subject matter.

As illustrated, the SDNC network device 100 can include a memory 120, L2/L3 lookup tables 122, a meter 124, a switching agent 126, and other components 128, in addition to the processor 102, the SDN agent 104, the tunneling agent 106, the SDN lookup tables 114, and the ports 116.

The memory 120 can be coupled to the processor 102 and can include any non-transitory computer-readable medium known in the art including, for example, volatile memory, such as Static Random Access Memory (SRAM) and Dynamic Random Access Memory (DRAM), and/or non-volatile memory, such as Read Only Memory (ROM), erasable programmable ROM, flash memories, etc. Further, in various implementations, one or more of various components of the SDNC network device 100 may be fully or partially stored in the memory 120 and may be executed by the processor 102.

The L2/L3 lookup tables 122 can include entries corresponding to the L2/L3 lookup settings of the SDNC network device 100 for implementing non-SDN or legacy control logic. The L2/L3 lookup tables 122 can also include entries to track packets received at the ports 116, such as entries indicating an inbound port at which a packet was received and the information in the packet address headers. Such entries can be used to regenerate an inbound port id to ensure that an outbound packet is not sent back through a port at which it was received, as will be discussed later.

The meter 124 can measure, control, and rate-limit the packets being forwarded over a port or a tunnel interface. For example, the flow rules may specify a threshold rate for the packets being forwarded over a tunnel interface. Accordingly, the meter 124 can determine when the incoming packet rate exceeds the threshold and can take a meter action on the packets. For example, if the meter action is set to 'drop', packets exceeding the meter limit may not be tunneled and may be dropped. In another example, if the meter action is set to 'dscp remark', packets exceeding the meter limit may have their DSCP remarked before being encapsulated and sent to the service entity 108. In one example, the meter actions of the meter 124 can be configured by the SDN controller 110 through the SDN agent 104. The meter action, as discussed herein may be applied on incoming packets received from a source device or on packets received through a tunnel interface, which are to be further forwarded.

The switching agent 126 can interface between the ports 116 and other agents, such as the SDN agent 104 and the tunneling agent 106. Further, the switching agent 126 can create entries in and lookup entries from the L2/L3 lookup tables 122. Accordingly, the switching agent 126 can track packets coming at the ports 116 using the entries in the L2/L3 lookup tables 122 and can also use the L2/L3 lookup tables 122 to forward packets based on legacy control logic or based on out ports or tunnel interfaces identified by the SDN agent 104.

In operation, in one example implementation, when a packet is received at one of the ports 116, the switching agent 126 can make an entry in the L2/L3 lookup table 122 indicating the inbound port on which the packet is received and the MAC address and VLAN tag of the packet. The switching agent 126 can do this both for packets received from a source device and for packets received over a tunnel interface from a service entity, such as the service entity 108. For example, in case of an encapsulated packet received over a tunnel interface, the switching agent 126 can make an entry in the L2/L3 lookup table 122 indicating the tunnel interface over which the packet was received and the encapsulation headers of the encapsulated packet. The switching agent 126 can then provide the packets to the SDN agent 104 for determining the out port based on the SDN lookup tables 114. In one example, in case the received packet is an encapsulated packet, the packet is decapsulated by the tunneling agent 106 to remove the encapsulation headers before being provided to the SDN agent 104.

Further, in one example, where the SDNC network device 100 is a hybrid network device that supports both SDN and non-SDN control logic, the switching agent 126 may determine, for example, based on the packet address headers, whether an incoming packet is to be handled through the SDN control logic or through the non-SDN control logic. Accordingly, the switching agent 126 may provide the incoming packet to the SDN agent 104 for determining a port through which the incoming packet is to be forwarded or may forward the incoming packet based on the L2/L3 lookup tables 122. In another example, incoming packets may be directly provided to the SDN agent 104 by the switching agent 126 and based on the flow rules it may be determined whether the incoming packets are to be processed through the SDN control logic or through the non-SDN control logic. In yet another example, certain ports in the ports 116 can be dedicated to being used with the SDN control logic and certain other ports can be dedicated to being used with the non-SDN control logic. The switching agent 126 can facilitate transfer of packets between the two types of dedicated ports thereby bridging them.

Further, the switching agent 126 can forward packets through the ports 116 based on the outgoing ports or tunnel interfaces identified by the SDN agent 104. For example, in case, based on the SDN lookup tables 114, the SDN agent 104 identifies that the packets are to be encapsulated and sent over the tunnel 118, the tunneling agent 106 can encapsulate the packets as per the tunnel configuration of the tunnel 118 and provide the encapsulated packets to the switching agent 126. The switching agent 126 can then forward the encapsulated packets through a port corresponding to the tunnel interface of the tunnel 118.

In another example, in case, based on the SDN lookup tables 114, the SDN agent 104 identifies that the packets are to be forwarded based on non-SDN or legacy control logic, i.e., the L2/L3 lookup tables 122, the switching agent 126 can determine an out port from the L2/L3 lookup tables 122 and forward the packets through the out port. The packets forwarded based on legacy control logic may be, in one example, packets received from the source device. In such an example, service insertion may not be performed for these packets. In another case, the packets forwarded based on legacy control logic may be the packets received after service insertion.

In one example, while forwarding the packets through an out port, the switching agent 126 can ensure that the packets are not sent back over the inbound port at which they were originally received from the source device. For this, the switching agent 126 can perform a reverse look-up of the L2/L3 lookup tables 122 based on the original MAC address headers and the original VLAN tag to determine an original inbound port at which the packets were received. Thus, determination of the original inbound port can be done without additional metadata being inserted into packet headers. Further, port level policies can also be applied on the packets based on the determined original inbound port. The port level policies can include traffic sampling for network visibility, Quality of Service (QoS), Access Control List (ACL), etc. Thus, port level policies can be applied even after service insertion, since the original inbound port can be determined using the original MAC address headers and original VLAN tag.

The other components 128 include other software and hardware components, such as operating systems and network interfaces, which may be used by the SDNC network device 100 for its functioning but may not be explicitly mentioned herein.

In one implementation, on receiving the incoming packets, the SDN agent 104 can refer the SDN lookup tables 114 to determine, from the flow entries, instructions for actions to be taken for the incoming packets. In case the incoming packets match the flow entry for being forwarded to the service entity 108 through a tunnel, the SDN agent 104 can provide the incoming packets to the tunneling agent 106. Based on the tunnel configuration provided by the SDN controller 110, the tunneling agent 106 can encapsulate the incoming packets and have the encapsulated packets sent to the service entity 108 over a tunnel interface thus forming the tunnel 118.

Further, based on the tunnel configuration, in case an incoming packet violates the maximum transmission unit (MTU), which indicates the maximum size of a packet that can be sent over the tunnel 118, the incoming packet may be fragmented by the tunneling agent 106 and may be delivered to the service entity 108 as multiple tunneled packets. In one example, in addition to sending the packets to the service entity 108 over the tunnel 118, the SDNC network device 100 can forward the packets to a destination device through a port of the ports 116 in case the service entity 108 provides a mirroring service, as will be discussed later with reference to FIG. 2a.

On receiving the encapsulated packets, the service entity 108 can decapsulate the packets and perform various services, such as traffic inspection and re-injection services, traffic monitoring services, or traffic re-routing services with possible content modification. In one example, if the packets were de-fragmented by the SDNC network device 100 before being sent to the service entity 108, the service entity may re-assemble the packets before performing the various services. Based on the service performed, the service entity 108 can take a post-service action including, for example, sending the packets back to the SDNC network device 100 over the tunnel 118, forwarding the packets to a second network device over another tunnel for directing the packets to a destination device, or discarding the packets, as will be discussed later with reference to FIGS. 2a, 2b, and 2c.

In one example, to send the packets back to the SDNC network device 100, the service entity 108 can re-encapsulate the packets, along with the original MAC address headers and the original VLAN tag, and send the re-encapsulated packets to the SDNC network device 100 over the tunnel 118. The encapsulation and tunneling protocols used by the service entity 108 can be similar to that used when the SDNC network device 100 sent the packets to the service entity 108. In one example, the encapsulation and tunneling protocols to be used are communicated to the service entity 108 by the SDNC network device 100 when the tunnel is established between the SDNC network device 100 and the service entity 108.

Further, the SDNC network device 100 can receive the packets from the service entity 108 over the tunnel 118 and decapsulate the received packets. The SDN agent 104 can refer the SDN lookup tables 114 to identify a set of instructions to be performed on the received packets. The set of instructions can be identified, for example, based on a tunnel interface at which the packets were received, in addition to other matching fields.

In one example, the SDN agent 104 can identify from the SDN lookup tables 114 that the received packets are to be sent to a second service entity. Accordingly, the SDN agent 104 can provide the received packets to the tunneling agent 106. The tunneling agent 106 can encapsulate the packets, along with the original MAC address headers and the original VLAN tag, as per the tunneling configuration for the second service entity and can provide the encapsulated packets to the switching agent 126. The switching agent 126 can forward the encapsulated packets to the second service entity for insertion of a second network service. Thus, a chain of network services can be inserted in the traffic flow with the packets still retaining the original source MAC address and the original source VLAN tag at the end of the chain.

Further, in one example, on receiving packets over a tunnel interface after one or more services have been performed, the SDN agent 104 may identify from the SDN lookup tables 114 that the packets are to be forwarded to a destination device. Accordingly, the SDNC network device 100 can forward the packets to the destination device either directly or through another network device.

In another example, after one or more services have been performed, the SDN agent 104 may identify from the SDN lookup tables 114 that the packets are to be forwarded based on non-SDN or legacy control logic, for example, through a NORMAL or FLOOD out port in OpenFlow. Accordingly, the packets can be forwarded based on the L2/L3 lookup tables 122, for example, by the switching agent 126. In one example, the switching agent 126 can perform a reverse look-up of the L2/L3 lookup tables 122 when the packets are to be forwarded based on non-SDN control logic, to identify an original inbound port on which the packet was originally received by the SDNC network device 100. The L2/L3 lookup tables 122 include incoming port information indexed by MAC address and VLAN id for packets received by the SDNC network device 100. Thus, the switching agent 126 can do a reverse lookup based on the original MAC address headers and the original VLAN tag. Thus, determination of the original inbound port can be done without additional metadata being inserted into packet headers. The switching agent 126 can then also ensure that the packet is not sent out through the original inbound port. Further, based on the original inbound port, port level policies can also be applied on the packets. The port level policies can include traffic sampling for network visibility, Quality of Service (QoS), Access Control List (ACL), etc.

Thus, it can be ensured that the packet is not sent back on an original inbound port at which the packet was first received by the SDNC network device 100 from a source device and it provides flexibility in applying port level policies after service insertion. Also, as mentioned above, since the packets retain the original MAC address headers and the original VLAN tag when forwarded from the SDNC network device 100, the network service insertion can be transparent to both the source device and the destination device. Further, various types of services can be dynamically inserted, such as traffic inspection and re-injection, traffic monitoring, and traffic re-routing with possible content modification as discussed below.

Figure 2A:
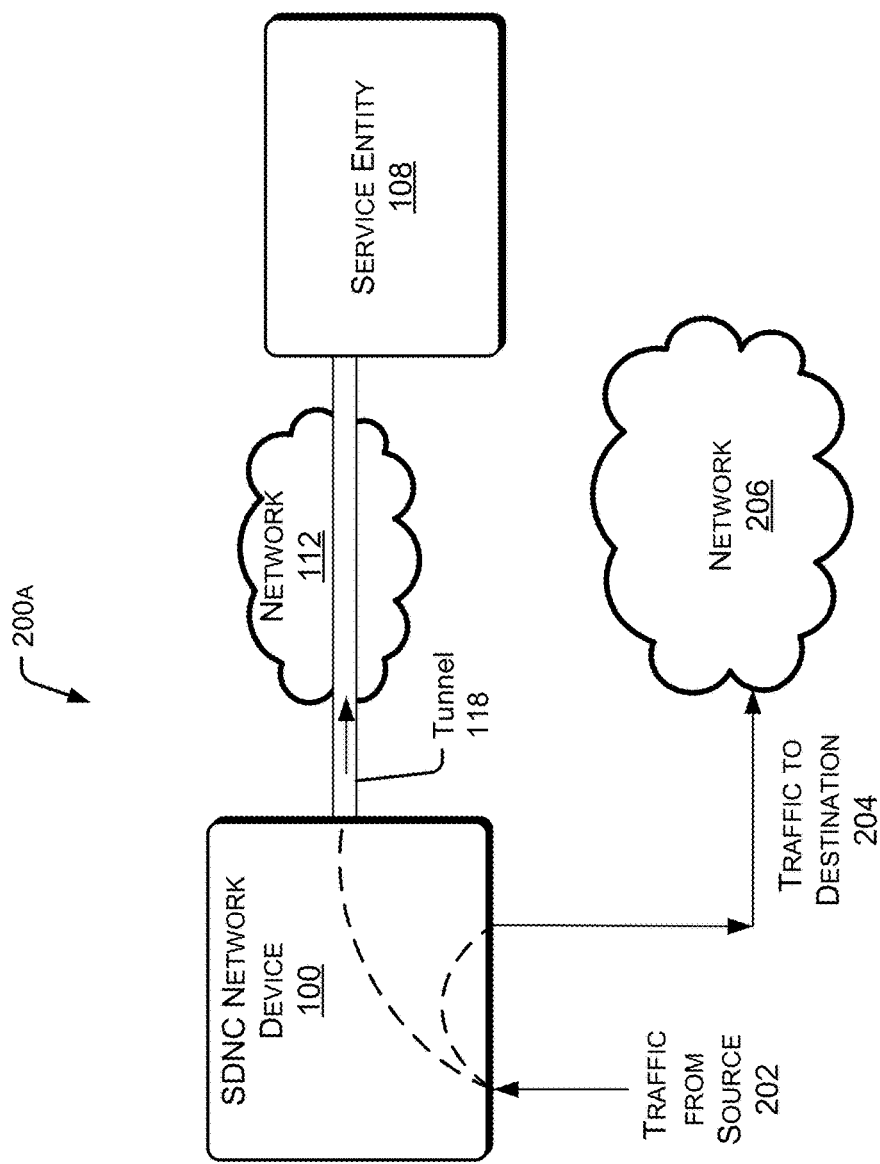
FIGS. 2a, 2b, and 2c illustrate scenarios implementing network service insertion, according to different examples of the present subject matter.
Figure 2B:
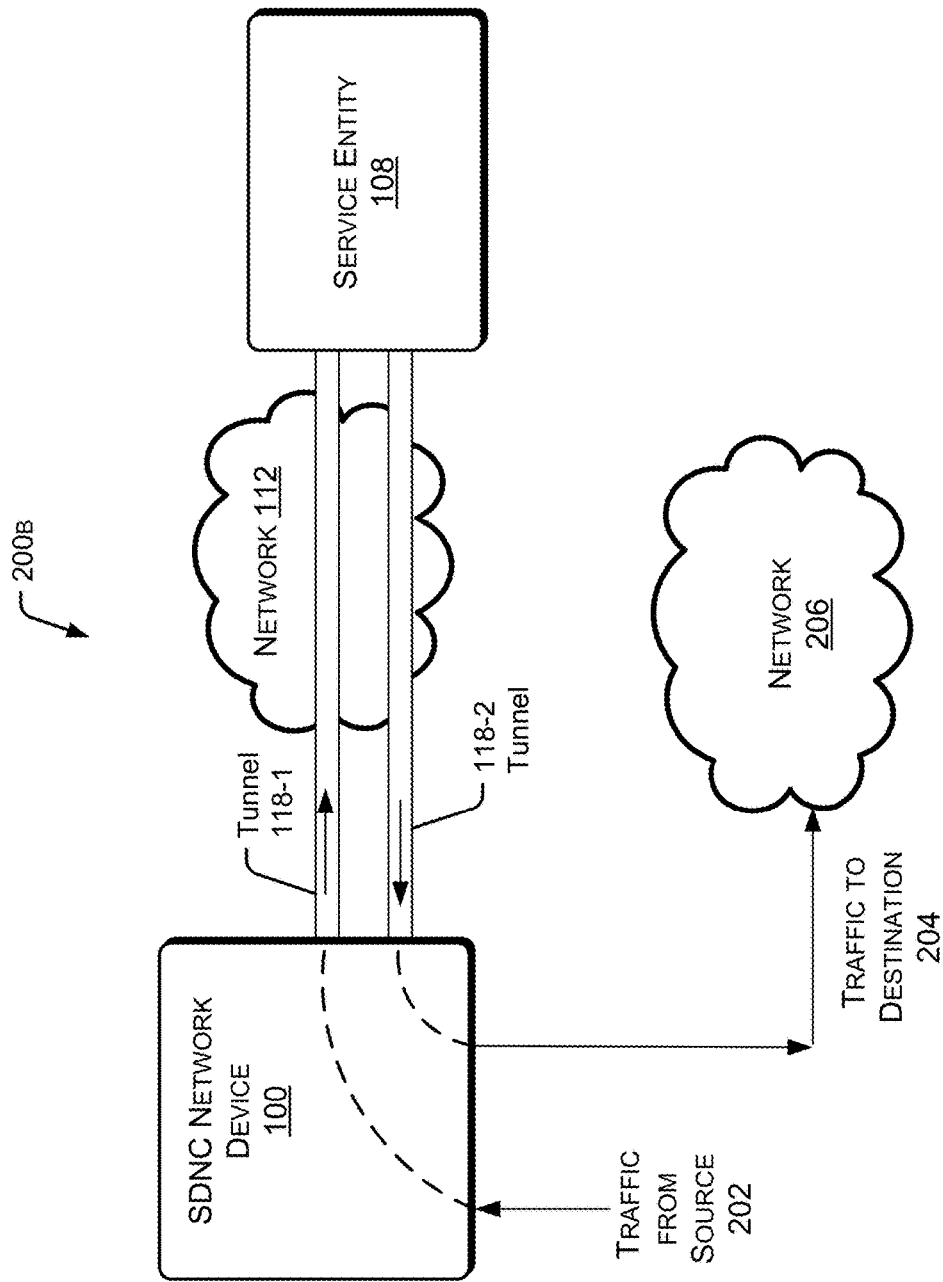
Figure 2C:
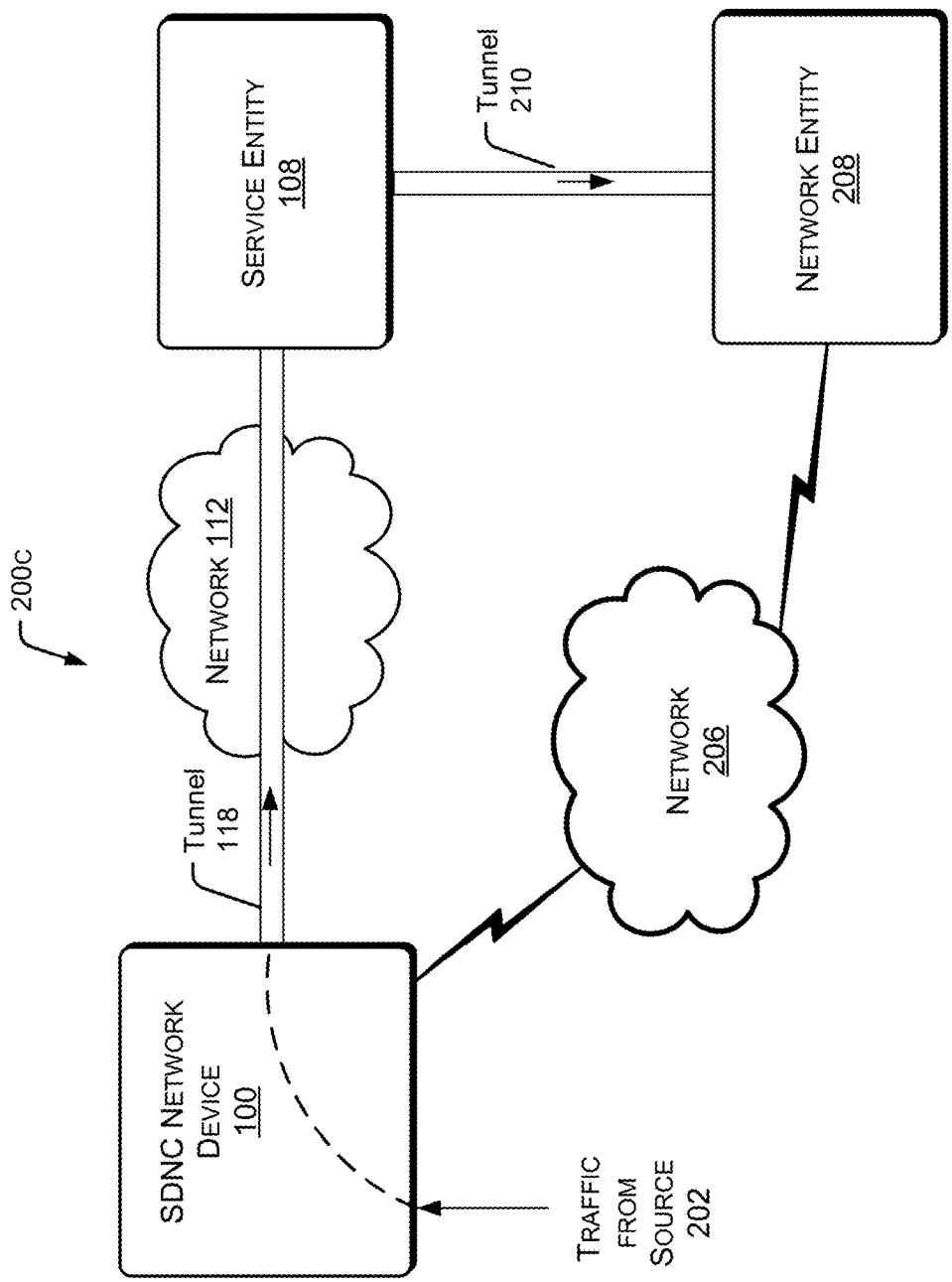

FIGS. 2a, 2b, and 2c illustrate scenarios implementing network service insertion, according to various examples of the present subject matter.

FIG. 2a illustrates an example mirroring scenario 200A, where the SDNC network device 100 can mirror a flow of traffic to the service entity 108 and, in parallel, forward the traffic to a destination device, according to one example of the present subject matter. For example, traffic from source 202, also referred to as source traffic 202, can be received at the SDNC network device 100. The SDN agent 104 can determine from the SDN lookup tables 114 that the source traffic 202 is to be mirrored to the service entity 108.

For example, the SDN controller 110 can provide a flow rule that for packets matching a particular flow entry, the out port is 'copy-tunnel+other_port'. Further, in the flow rule, the SDN controller 110 can specify the tunnel interface and the other port to be used. When the SDN agent 104 identifies incoming packets that match this flow rule, the SDN agent 104 can direct the tunneling agent 106 to encapsulate the incoming packets based on the tunnel interface's configured attributes and have the encapsulated packets sent to the tunnel remote endpoint, i.e., the service entity 108, over the tunnel 118, as discussed earlier. The service entity 108, in this example, can receive and analyze the packets and then drop the packets.

In one example, the flow rule may allow the SDNC network device 100 to send the same packet to multiple copy-tunnels. In another example, the copy-tunnel could be a multicast destination and thereby multiple tunnel destinations can be receiving the same copy of the packet for inspection. This can be done, for example, to handle the case of redundancy, where multiple service entities may be used for service insertion and for possible load balancing.

In addition to forwarding the packets over the copy-tunnel(s), the SDN agent 104 can direct the incoming packets to be also forwarded to the other port for sending a flow of traffic to a destination 204, for example, over a network 206. Like the network 112, the network 206 can also be a wired network or a wireless network or a combination of the two and may be in the same IP subnet as the SDNC network device 100 or in a different IP subnet.

The other port specified in the flow rule can be a physical port, a tunnel interface or a special port supported by the SDN agent 104. For example, in case of OpenFlow, the special port may be NORMAL, FLOOD, ANY or CONTROLLER. In case the other port is CONTROLLER, the incoming packets can be sent to the SDN controller 110, which can decide whether to drop the packets or provide a flow rule to the SDN agent 104 to forward the packets. In another example, when the special port is NORMAL, the SDN agent 104 can direct the packets for forwarding by the switching agent 126 based on the L2/L3 lookup tables 122.

The mirroring scenario 200A can be used, for example, in case the service entity 108 provides services, such as traffic monitoring, traffic analysis, and intrusion detection, where the service entity 108 may analyze or monitor packets, but may not modify the packet content or flow. Further, based on the analysis or monitoring, various policies can be provided to the SDN controller 110 to apply on the SDNC network device 100. For example, based on traffic load, the SDN controller 110 can program rules to load balance traffic across different paths. In another example, based on nature of traffic, the SDN controller 110 can program a rate-limit for some source devices to make sure the network is not overwhelmed with too much traffic from those source devices. In yet another example, the SDN controller 110 could program QoS rules to provide some traffic high-priority and some traffic low-priority. Further, the SDN controller 110 may also quarantine a source device by dropping packets received from that source device if the traffic is deemed malicious.

FIG. 2b illustrates an example interception scenario 200B, where the service entity 108 may inspect the packets and re-inject or block the packets based on the inspection, according to one example of the present subject matter. For example, source traffic 202, can be received at the SDNC network device 100. The SDN agent 104 can determine from the SDN lookup tables 114 that the source traffic 202 is to be intercepted.

For example, the SDN controller 110 can provide a flow rule that for packets matching a particular flow entry, the out port is 'intercept-tunnel'. Further, in the flow rule, the SDN controller 110 can specify the tunnel interface to be used. When the SDN agent 104 identifies incoming packets that match this flow rule, the SDN agent 104 can direct the tunneling agent 106 to encapsulate the incoming packets based on the tunnel interface's configured attributes and have the encapsulated packets sent to the tunnel remote endpoint, i.e., the service entity 108, over the tunnel 118, as discussed earlier. For discussion purposes, FIG. 2b represents a transmission line of the tunnel 118 as tunnel 118-1 and a receive line of the tunnel 118 as tunnel 118-2, the transmission and receiving being with respect to the SDNC network device 100. Thus, in one example, the encapsulated packets can be sent over the tunnel 118-1 to the service entity 108.

In one example, when the intercept flow rule is also associated with a meter that rate-limits the number of packets, the meter action can take effect when the incoming packet rate exceeds the meter limit. For example, if the meter action is set to 'drop', packets exceeding the meter limit may not be tunneled and may be dropped. In another example, if the action is set to 'dscp remark', packets exceeding the meter limit may have their DSCP remarked before being encapsulated and sent to the service entity 108.

Upon inspection, the service entity 108 can determine whether the packets conform to policies, such as an organization's firewall settings, applied by a service application, such as a firewall. Accordingly, the service entity 108 can send the packets back to the SDNC network device 100 through the tunnel 118-2 when the packets are allowed. Alternatively, the service entity 108 can drop the packets and not transmit packets over the tunnel 118-2 when the packets are not allowed as per the service application. In such a case, the service entity can also program a quarantine rule for the source device of the traffic so that subsequent packets from that source device may be blocked.

Further, in case the service entity 108 sends the packets back to the SDNC network device 100, the SDN agent 104 can refer the SDN lookup tables 114 to determine instructions for action to be taken on the received packets. For example, the SDN agent 104 can direct the received packets to be forwarded to a destination device, shown as traffic to a destination 204, for example, over the network 206. The received packets can be forwarded through a physical port, a tunnel interface or a special port supported by the SDN agent 104, as discussed earlier. For example, based on the SDN lookup tables 114, the SDN agent 104 can direct the packets to be forwarded by the switching agent 126 based on the L2/L3 lookup tables 122. Also, as discussed above, the switching agent 126 can determine the original inbound port id based on a reverse lookup of the L2/L3 lookup tables 122. Further, while forwarding the packets, the switching agent 126 can apply port level policies and can also ensure that the packets are not sent back over the original inbound port.

In one example, the intercept-tunnel could be a multicast IP address and so the same packet may get sent to multiple instances of the service entity, for example, for redundancy or load balancing. In such a case, one of the service entities can send the packet back to the SDNC network device 100 based on, for example, a policy configuration on the service entities. For example, for one set of VLANs, one of the service entities can respond back and for another set of VLANs, another service entity can respond back.

The interception scenario 200B can be used, for example, in case the service entity 108 provides services, such as traffic sanitization, intrusion prevention, and firewall, where the service entity 108 may allow or block the flow of traffic based on an inspection of the packets.

FIG. 2c illustrates an example re-routing scenario 200C, where the service entity 108 may re-route the packets and may modify the packets, according to one example of the present subject matter. For example, source traffic 202, can be received at the SDNC network device 100. The SDN agent 104 can determine from the SDN lookup tables 114 that the source traffic 202 is to be forwarded to the service entity 108 for re-routing.

For example, the SDN controller 110 can provide a flow rule that, for packets matching a particular flow entry, the out port is 'forward-tunnel'. Further, in the flow rule, the SDN controller 110 can specify the tunnel interface to be used. When the SDN agent 104 identifies incoming packets that match this flow rule, the SDN agent 104 can direct the tunneling agent 106 to encapsulate the incoming packets based on the tunnel interface's configured attributes and have the encapsulated packets sent to the tunnel remote endpoint, i.e., the service entity 108, over the tunnel 118, as discussed earlier.

In one example, when the forward flow rule is also associated with a meter that rate-limits the number of packets, the meter action can take effect when the incoming packet rate exceeds the meter limit. For example, if the meter action is set to 'drop', packets exceeding the meter limit may not be tunneled and may be dropped. In another example, if the action is set to 'dscp remark', packets exceeding the meter limit may have their DSCP remarked before being encapsulated and sent to the service entity 108.

Upon receiving the packets, the service entity 108 can determine, based on re-routing policies provided in the service entity 108, a network entity 208 to which the packets are to be re-routed. In one example, the network entity 208 can be a second network device to which the packets are to be re-routed for sending to a destination device. The second network device may be a SDN compatible network device or a legacy network device. Accordingly, the network entity 208 can then forward the packets to the destination device based on flow rules or based on an L2/L3 lookup. In another example, the network entity 208 may be the destination device itself. The service entity 108 may thus directly re-route the packets to the destination device based on, for example, Layer-4 (L4) to Layer-7 (L7) content. In yet another example, the network entity 208 can be a second service entity that inserts a second service in the flow of traffic. Also, based on packet inspection and the re-routing policies, the service entity 108 may modify the packet content before re-routing the packet to the network entity 208, for example, to remove content that is not allowed.

Further, the network entity 208 can be in a different IP subnet than the SDNC network device 100 and/or the service entity 108. In one example, the service entity 108 may set up a second tunnel 210 with the network entity 208, and may encapsulate and send the packets to the second network entity 208 over the tunnel 210. The tunnel configurations of the second tunnel 210 may be determined from a tunnel configuration module provided in the service entity 108. In one example, the SDN controller 110 may provide the re-routing policies and the tunnel configurations to the service entity 108. In another example, a different SDN controller or computing system may be used for providing the re-routing policies and the tunnel configurations to the service entity 108.

The re-routing scenario 200C can be used, for example, in case the service entity 108 provides services, such as server load balancing, where the service entity 108 could determine which network entity 208 to re-route-to based on, for example, CPU load on the network entity 208.

Figure 3:
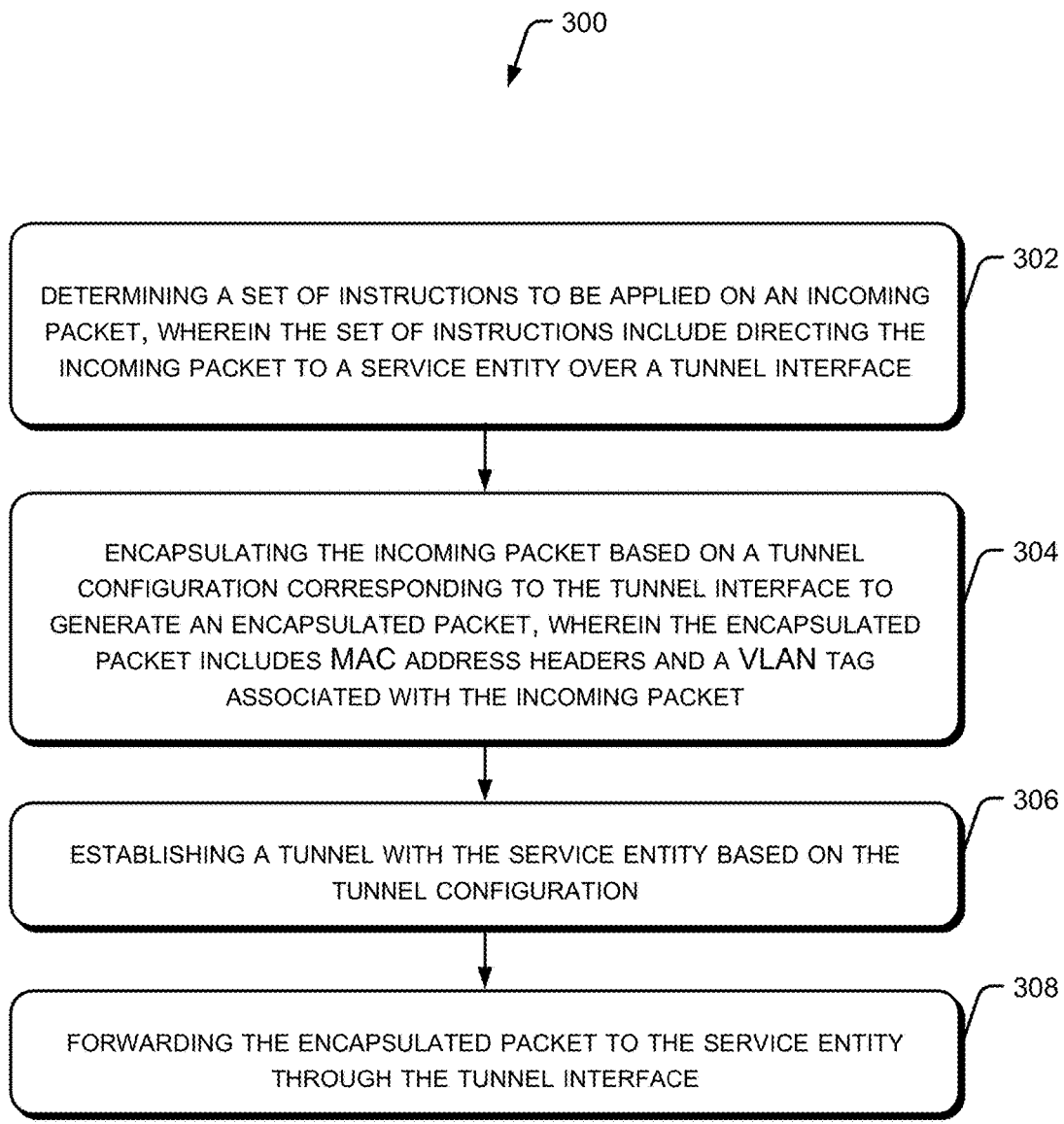
FIG. 3 illustrates an example method for network service insertion, according to an example of the present subject matter.

FIG. 3 illustrates method 300 for network service insertion, according to an example of the present subject matter. The order in which the method 300 is described is not intended to be construed as a limitation, and some of the described method blocks can be combined in a different order to implement the method 300, or an equivalent alternative method. Additionally, individual blocks may be deleted from the method 300 without departing from the spirit and scope of the subject matter described herein. Furthermore, the method 300 may be implemented in any suitable hardware, computer-readable instructions, or combination thereof.

The steps of the method 300 may be performed by either a computing device under the instruction of machine executable instructions stored on a non-transitory computer readable medium or by dedicated hardware circuits, microcontrollers, or logic circuits. For example, the method 300 may be performed by the SDNC network device 100 in the network environment. Herein, some examples are also intended to cover non-transitory computer readable medium, for example, digital data storage media, which are computer readable and encode computer-executable instructions, where said instructions perform some or all of the steps of the described method 300.

As depicted in FIG. 3, at block 302, a set of instructions to be applied on an incoming packet are determined based on flow rules received from an SDN controller. The set of instructions can include directing the incoming packet to a service entity over a tunnel interface. For example, the SDNC network device 100 can determine the tunnel interface for sending packets to the service entity 108 based on flow rules received from the SDN controller 110. In one example, the set of instructions can also include forwarding the incoming packet through a port determined, for example, from the SDN lookup tables 114 or from the L2/L3 lookup tables 122, in addition to directing the incoming packet to the service entity.

At block 304, the incoming packet is encapsulated based on a tunnel configuration corresponding to the tunnel interface to generate an encapsulated packet. The tunnel configuration can also be provided by the SDN controller. Further, the encapsulated packet can include media access control (MAC) address headers and a virtual local area network (VLAN) tag associated with the incoming packet. For example, the tunneling agent 106 can encapsulate the packets based on tunnel configuration provided by the SDN controller 110. In one example, prior to encapsulating, the tunneling agent 106 may determine whether the incoming packet includes the VLAN tag, and may insert the VLAN tag when the incoming packet does not include the VLAN tag. The inserted VLAN tag can include an inbound port VLAN id as the VLAN id.

At block 306, a tunnel is established with the service entity based on the tunnel configuration. For example, the tunnel may correspond to one of a copy tunnel for mirroring incoming packets to the service entity, an intercept tunnel for sending the incoming packets to and receiving packets from the service entity, and a forward tunnel for re-routing packets through the service entity, for example, to a network entity. Further, the tunnel may be a multicast tunnel for sending the encapsulated packet to multiple instances of the service entity. As will be understood, establishing the tunnel can include exchanging set up messages and the tunnel configuration with the service entity so that encapsulated packets can be sent to the service entity.

At block 308 the encapsulated packet is forwarded to the service entity through the tunnel interface over the tunnel. For example, the switching agent 126 may send the encapsulated packet over the tunnel 118 through a port corresponding to the tunnel interface.

Further, as discussed above, the service entity can take a post-service action including sending back the packets to the SDNC network device through the tunnel interface upon traffic inspection. The SDNC network device can determine a forwarding action for a received packet received through the tunnel interface. The determined forwarding action can be one of forwarding the received packet to a second service entity through a second tunnel interface, forwarding the received packet to a destination device, and providing the received packet to a switching agent to forward based on L2/L3 lookup tables.

In one example, when forwarding the packet based on L2/L3 lookup tables, the switching agent also determines an original inbound port, at which the packet was originally received, by a reverse lookup of the L2/L3 lookup tables. The switching agent can them ensure that the packet is not sent back over the original inbound port and can apply port level policies on the packet. Thus, the devices and methods of the present subject matter can provide flexibility in deploying the service entity and in taking post-service actions.

Figure 4:
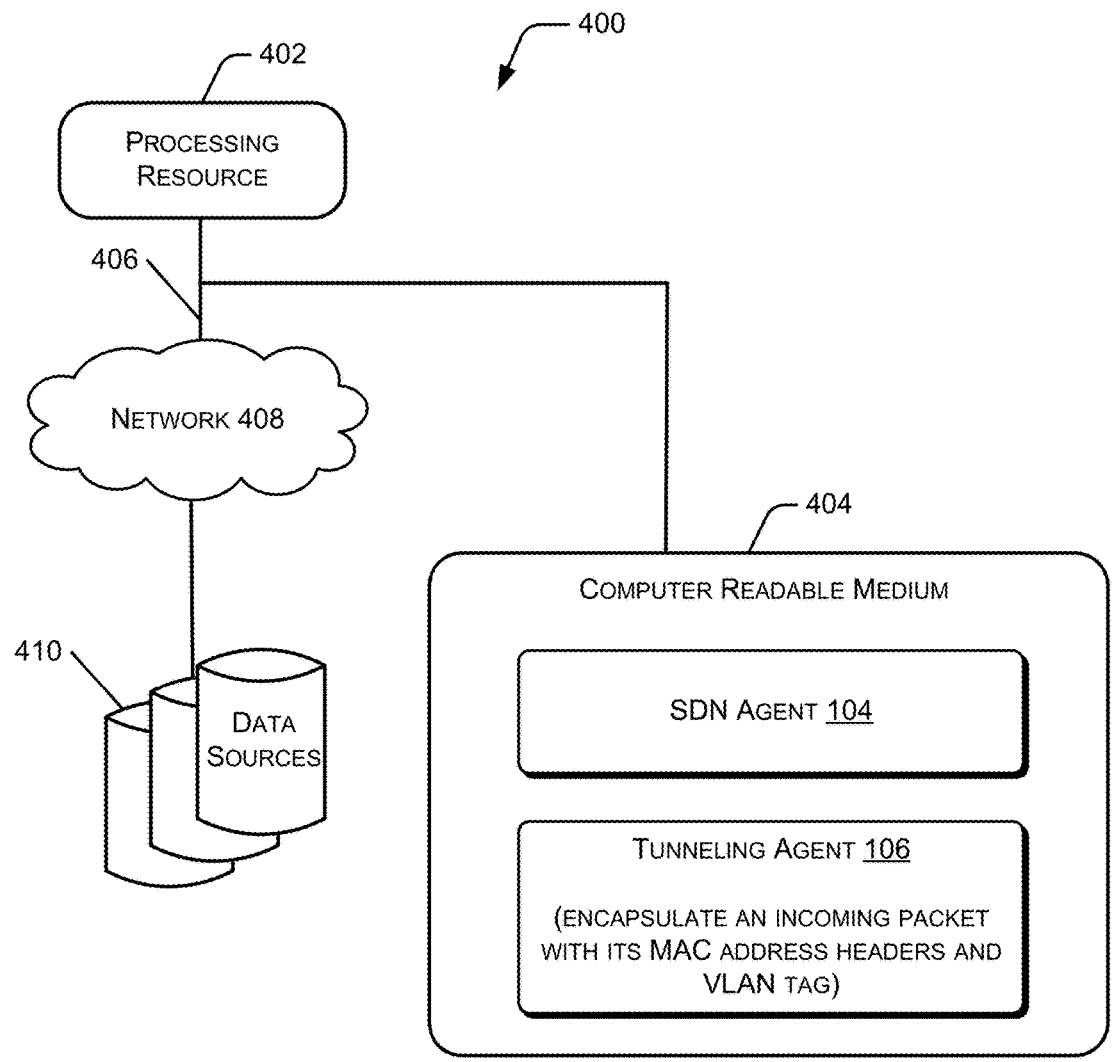
FIG. 4 illustrates an example network environment implementing a non-transitory computer readable medium for network service insertion, according to an example of the present subject matter.

FIG. 4 illustrates an example network environment 400 implementing a non-transitory computer readable medium for network service insertion, according to an example of the present subject matter. The network environment 400 may be a public networking environment or a private networking environment. In one implementation, the network environment 400 includes a processing resource 402 communicatively coupled to a non-transitory computer readable medium 404 through a communication link 406.

For example, the processing resource 402 can be a processor of a network device, such as the SDNC network device 100. The non-transitory computer readable medium 404 can be, for example, an internal memory device or an external memory device. In one implementation, the communication link 406 may be a direct communication link, such as one formed through a memory read/write interface. In another implementation, the communication link 406 may be an indirect communication link, such as one formed through a network interface. In such a case, the processing resource 402 can access the non-transitory computer readable medium 404 through a network 408. The network 408, like the communication network 112, may be a single network or a combination of multiple networks and may use a variety of different communication protocols.

The processing resource 402 and the non-transitory computer readable medium 404 may also be communicatively coupled to data sources 410 over the network 408. The data sources 410 can include, for example, databases and computing devices. The data sources 410 may be used by the database administrators and other users to communicate with the processing resource 402.

In one implementation, the non-transitory computer readable medium 404 includes a set of computer readable instructions, such as instructions for implementing the SDN agent 104 and the tunneling agent 106. The set of computer readable instructions, referred to as instructions hereinafter, can be accessed by the processing resource 402 through the communication link 406 and subsequently executed to perform acts for network service insertion.

For discussion purposes, the execution of the instructions by the processing resource 402 have been described with reference to various components introduced earlier with reference to description of FIGS. 1a, 1b, 1c, 1d, 2a, 2b, and 2c.

In an example, the instructions can cause the processing resource 402 to determine a tunnel interface corresponding to a service entity to which an incoming packet is to be directed, based on a matching flow rule. For example, the matching flow rule can be determined from flow rules provided by an SDN controller 110 to the SDN agent 104 and stored in the SDN lookup tables 114.

Further, the incoming packet can be encapsulated based on a tunnel configuration corresponding to the tunnel interface to generate an encapsulated packet. For example, the tunnel configuration can be provided by the SDN controller 110 to the tunneling agent 106, which can then encapsulate the incoming packet. In one example, the encapsulated packet can include media access control (MAC) address headers and a virtual local area network (VLAN) tag associated with the incoming packet. The tunneling agent 106 can also determine whether the incoming packet is associated with the VLAN tag and can insert the VLAN tag when the incoming packet is not associated with the VLAN tag. The inserted VLAN tag can include a VLAN id assigned based on one of a PVID of an inbound port, a protocol of the incoming packet, the MAC address of the incoming packet and an IP address of the incoming packet. The encapsulated packet can be then provided for forwarding to the service entity through the tunnel interface. In one example, based on the matching flow rule, the incoming packet may be forwarded to a destination device in addition to being sent to the service entity 108.

As discussed earlier, upon receiving the encapsulated packets, the service entity can decapsulate the packets and perform various services including intrusion detection, intrusion prevention, web filtering, etc. Based on the type of service performed, the service entity can take a post-service action including, for example, sending the packets back over the tunnel through which the packets were received, forwarding the packets over a second tunnel to a destination device or a second network device that can direct the packets to the destination device, or discarding the packets. Further, in case the packets are sent back, the SDN agent 104 can determine a next set of actions to be performed based on the SDN lookup tables 114. For example, the packet can be sent to another service entity or to a destination device. Further, in case the packet is to be sent to the destination device, the packet can be forwarded based on an SDN control logic or non-SDN control logic, as discussed earlier.

Thus, the methods and devices of the present subject matter help implement network service insertion transparently, dynamically, and securely, irrespective of where the service entity is deployed. Although implementations for network service insertion have been described in language specific to structural features and methods, it can be understood that the specific structural features and methods are disclosed as examples of device and methods for network service insertion.

What is claimed is:
1. A network device comprising:
a processor;
a software defined network (SDN) agent, executable on the processor, to determine, based on flow rules, a tunnel interface corresponding to a service entity to which an incoming packet is to be directed; and
a tunneling agent executable on the processor to:
receive different tunnel configurations from an SDN controller, the different tunnel configurations specifying different encapsulations of packets, and
encapsulate the incoming packet based on a selected tunnel configuration corresponding to the tunnel interface to generate an encapsulated packet, the selected tunnel configuration selected from among the different tunnel configurations based on the tunnel interface determined based on the flow rules, wherein the encapsulated packet includes media access control (MAC) address headers and a virtual local area network (VLAN) tag associated with the incoming packet, wherein the VLAN tag includes one of a VLAN tag present in the incoming packet and a VLAN tag inserted by the tunneling agent;
provide the encapsulated packet for forwarding to the service entity through the tunnel interface; wherein the processor is to receive a packet from the service entity after the encapsulated packet is forwarded to the service entity, the packet form the service entity being a re-encapsulated packet produced by the service entity responsive to the service entity decapsulating the encapsulated packet to produce a decapsulated packet, applying a service action on the decapsulated packet, and re-encapsulating the decapsulated packet following the applying of the service action.

2. The network device of claim 1, wherein the tunneling agent is executable on the processor to insert the VLAN tag responsive to the incoming packet not including the VLAN tag, wherein the inserted VLAN tag includes a VLAN identifier (ID) determined from a VLAN assignment configuration based on one of a Port Virtual ID (PVID) of an inbound port, a protocol of the incoming packet, a MAC address of the incoming packet, and an Internet Protocol (IP) address of the incoming packet.

3. The network device of claim 1, wherein the SDN agent is executable on the processor to further communicate with the SDN controller to configure the flow rules in the network device.

4. The network device of claim 1, further comprising a switching agent executable on the processor to determine, for a decapsulated packet, an original inbound port ID based on a reverse layer 2 or layer 3 (L2/L3) lookup of the MAC address headers and the VLAN tag associated with the decapsulated packet.

5. The network device of claim 1, wherein the SDN agent is executable on the processor to further determine, based on the flow rules, a forwarding action for a received packet received through the tunnel interface, the forwarding action being determined based on an ID of the tunnel interface, and MAC address headers and the VLAN tag encapsulated in the received packet.

6. The network device of claim 1, wherein the tunnel interface corresponds to a multicast tunnel for forwarding the encapsulated packet to multiple instances of the service entity.

7. The network device of claim 1, wherein the SDN agent is executable on to the processor to further forward the incoming packet through a port in addition to directing to the tunnel interface based on a matching flow rule.

8. The network device of claim 1, wherein the service action comprises an inspection of the decapsulated packet, an intrusion detection applied to the decapsulated packet, an intrusion prevention applied to the decapsulated packet, or a filtering of the decapsulated packet.

9. The network device of claim 1, wherein the processor is to:
decapsulate the packet from the service entity to produce a further decapsulated packet;
determine based on the flow rules that the further decapsulated packet is to be forwarded to a second service entity to apply a second service action; and
in response to the determining, encapsulate the further decapsulated packet for forwarding through a tunnel to the second service entity.

10. The network device of claim 1, wherein the processor is to:
decapsulate the packet from the service entity to produce a further decapsulated packet;
determine based on the flow rules that the further decapsulated packet is to be sent to a destination device; and
in response to the determining, send the further decapsulated packet to the destination device.

11. The network device of claim 1, wherein the different tunnel configurations received from the SDN controller comprise a first tunnel configuration specifying encapsulation for a layer 2-in-layer 2 tunnel, and a second tunnel configuration specifying encapsulation for a layer 2-in-layer 3 tunnel.

12. A method comprising:
determining, by a network device, a set of instructions to be applied on an incoming packet, based on flow rules received from a software defined network (SDN) controller, wherein the set of instructions includes instructions directing the incoming packet to a service entity over a tunnel interface;
encapsulating, by the network device, the incoming packet based on a tunnel configuration corresponding to the tunnel interface to generate an encapsulated packet, wherein the tunnel configuration is provided by the SDN controller, and wherein the encapsulated packet includes media access control (MAC) address headers and a virtual local area network (VLAN) tag associated with the incoming packet;
establishing, by the network device, a tunnel with the service entity based on the tunnel configuration corresponding to the tunnel interface;
forwarding, by the network device, the encapsulated packet to the service entity through the tunnel interface; and
receiving, by the network device, a packet from the service entity after the encapsulated packet has been forwarded to the service entity, the packet from the service entity being a re-encapsulated packet produced by the service entity responsive to the service entity decapsulating the encapsulated packet to produce a decapsulated packet, applying a service action on the decapsulated packet, and re-encapsulating the decapsulated packet following the applying of the service action.

13. The method of claim 12 further comprising:
determining whether the incoming packet includes the VLAN tag; and
inserting the VLAN tag in the encapsulated packet in response to the incoming packet not including the WAN tag, wherein the inserted VLAN tag includes a VLAN identifier (ID) determined from a VLAN assignment configuration based on one of a Port Virtual ID (PVID) of an inbound port, a protocol of the incoming packet, a MAC address of the incoming packet, and an Internet Protocol (IP) address of the incoming packet.

14. The method of claim 12 further comprising determining, based on the flow rules, a forwarding action for a received packet received through the tunnel interface, the forwarding action being one of: forwarding the received packet to a second service entity through a second tunnel interface, forwarding the received packet to a destination device, and forwarding the received packet based on layer 2 or layer 3 lookup tables.

15. The method of claim 12 further comprising:
decapsulating, by the network device, the packet from the service entity to obtain a further decapsulated packet with MAC address headers and a VLAN tag associated with the further decapsulated packet; and
determining, by the network device, an original inbound port identifier (ID) of the further decapsulated packet based on a reverse lookup of layer 2 or layer 3 lookup tables with the MAC address headers and the VLAN tag associated with the further decapsulated packet.

16. The method of claim 12, wherein the tunnel corresponds to one of: a copy tunnel for mirroring incoming packets to the service entity, an intercept tunnel for sending the incoming packets to and receiving packets from the service entity, and a forward tunnel for re-routing packets through the service entity.

17. A non-transitory computer readable medium storing computer readable instructions that, when executed by a processor, cause a network device to:
- receive different tunnel configurations from a software defined network (SDN) controller, the different tunnel configurations specifying different encapsulations of packets;
- determine, based on flow rules, a tunnel interface corresponding to a service entity to which an incoming packet is to be directed;
- encapsulate the incoming packet based on a selected tunnel configuration corresponding to the tunnel interface to generate an encapsulated packet, the selected tunnel configuration selected from among the different tunnel configurations based on the tunnel interface determined based on the flow rules, wherein the encapsulated packet includes media access control (MAC) address headers of the incoming packet and a VLAN tag;
- forward the encapsulated packet to the service entity through the tunnel interface; and
- receive a packet from the service entity after the encapsulated packet has been forwarded to the service entity, the packet from the service entity being a re-encapsulated packet produced by the service entity responsive to the service entity decapsulating the encapsulated packet to produce a decapsulate packet, applying a service action on the decpasulated packet, and re-encapsulating the decapsulated packet following the applying of the service action.

18. The non-transitory computer readable medium of claim 17, wherein the computer readable instructions, when executed, further cause the network device to establish a tunnel with the service entity based on the selected tunnel configuration for forwarding the encapsulated packet, wherein the tunnel corresponds to one of: a copy tunnel for mirroring incoming packets to the service entity, an intercept tunnel for sending the incoming packets to and receiving packets from the service entity, and a forward tunnel for re-routing packets through the service entity.

* * * * *